United States Patent
Kondoh

(10) Patent No.: US 8,133,660 B2
(45) Date of Patent: *Mar. 13, 2012

(54) METHOD OF MANUFACTURING A COORDINATE DETECTOR

(75) Inventor: Koichi Kondoh, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 12/463,468

(22) Filed: May 11, 2009

(65) Prior Publication Data

US 2009/0286186 A1 Nov. 19, 2009

(30) Foreign Application Priority Data

May 15, 2008 (JP) ................................ 2008-128139

(51) Int. Cl.
*G03F 7/20* (2006.01)

(52) U.S. Cl. ........................................ 430/311; 430/313

(58) Field of Classification Search .................. 430/311, 430/313

See application file for complete search history.

(56) References Cited

U.S. PATENT DOCUMENTS

| 2007/0013678 | A1 | 1/2007 | Nakajima et al. | |
| 2009/0266624 | A1* | 10/2009 | Kondoh et al. | 178/18.05 |
| 2009/0283339 | A1* | 11/2009 | Kondoh | 178/18.05 |
| 2009/0283498 | A1* | 11/2009 | Kondoh | 216/65 |

FOREIGN PATENT DOCUMENTS

| JP | 10-83251 A | 3/1998 |
| JP | 2001-125724 A | 5/2001 |
| JP | 2007-25904 A | 2/2007 |
| KR | 10-0573931 | 4/2006 |

OTHER PUBLICATIONS

Office Action dated Jan. 7, 2011 issued with respect to the corresponding Korean Patent Application No. 10-2009-0041704 with partial translation.

* cited by examiner

*Primary Examiner* — Shean Wu

(74) *Attorney, Agent, or Firm* — IPUSA, PLLC

(57) ABSTRACT

A method of manufacturing a coordinate detector having a resistive film and a common electrode for applying a voltage to the resistive film is disclosed that includes the steps of (a) applying a photoresist onto the resistive film formed on a substrate formed of an insulator; (b) forming a resist pattern on the resistive film by exposing the applied photoresist to light through a predetermined mask and subsequently developing the applied photoresist; (c) forming a resistive film removal region by removing a portion of the resistive film without the resist pattern; (d) removing the resist pattern after step (c); and (e) forming the common electrode over the resistive film removal region after step (d).

6 Claims, 16 Drawing Sheets

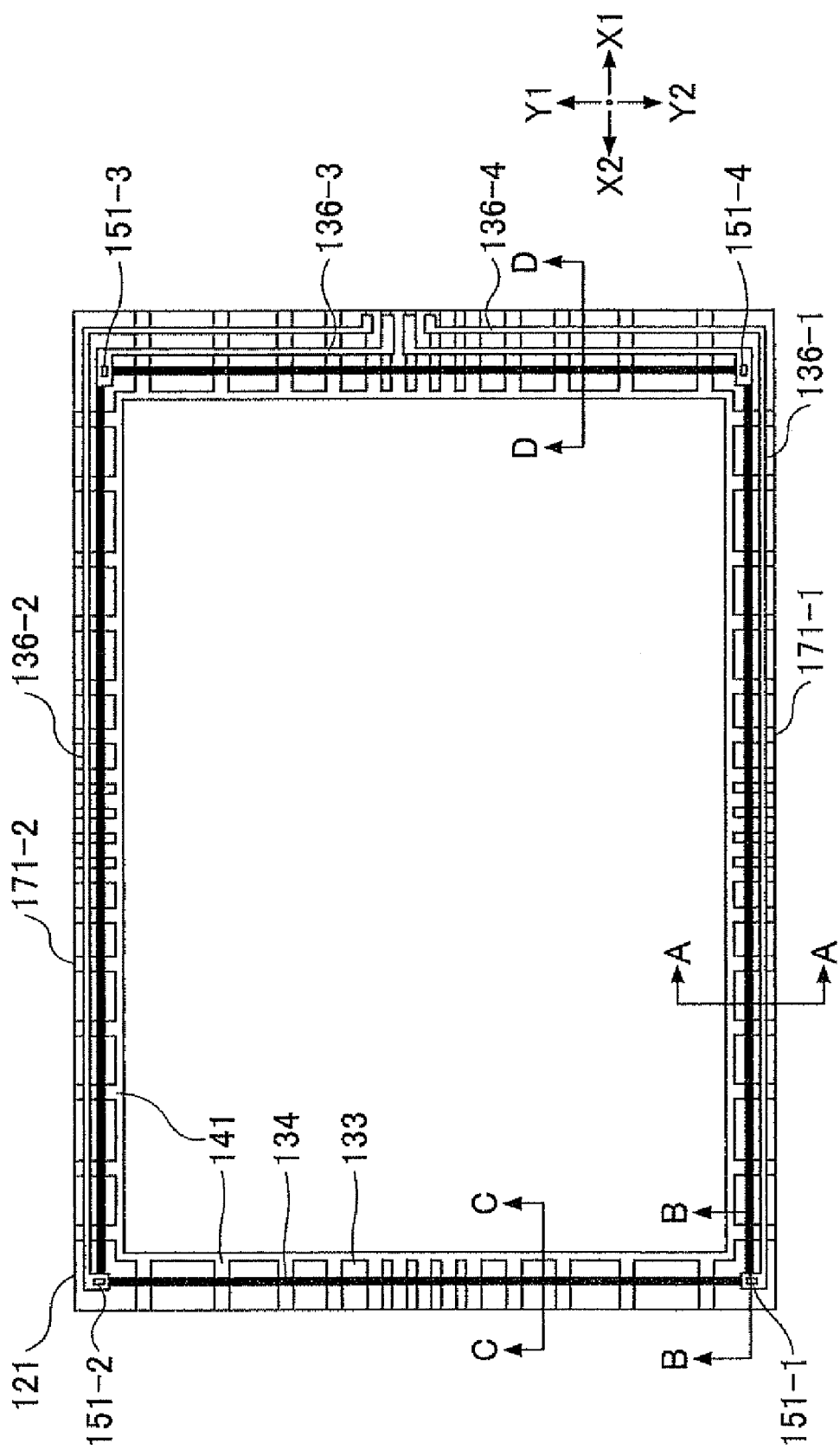

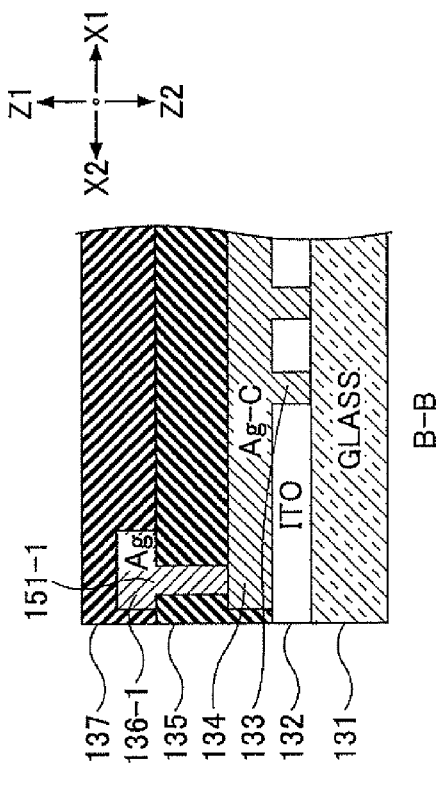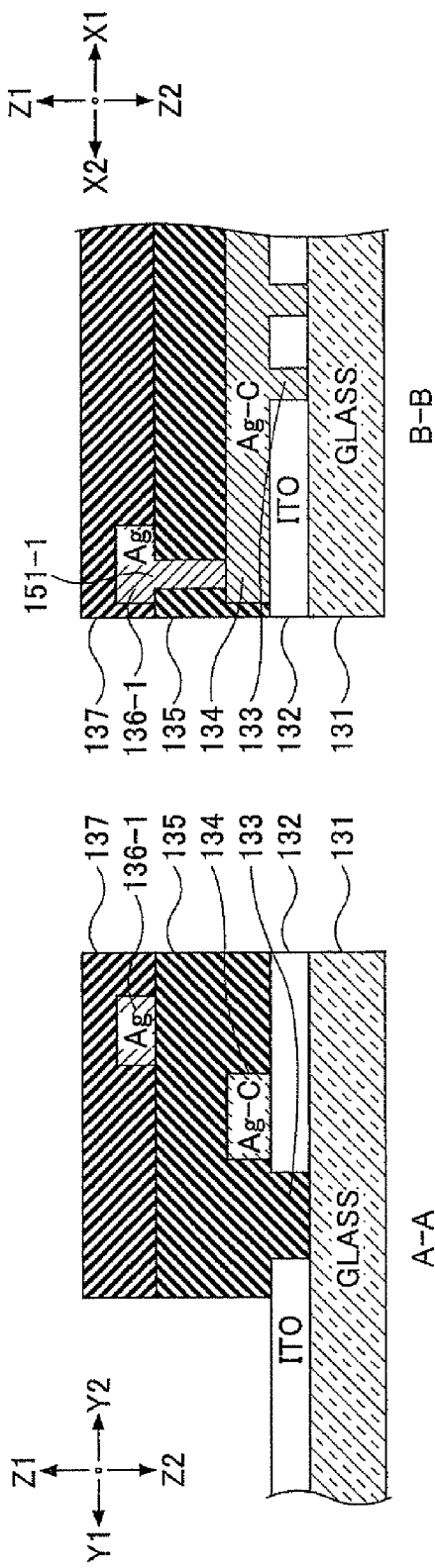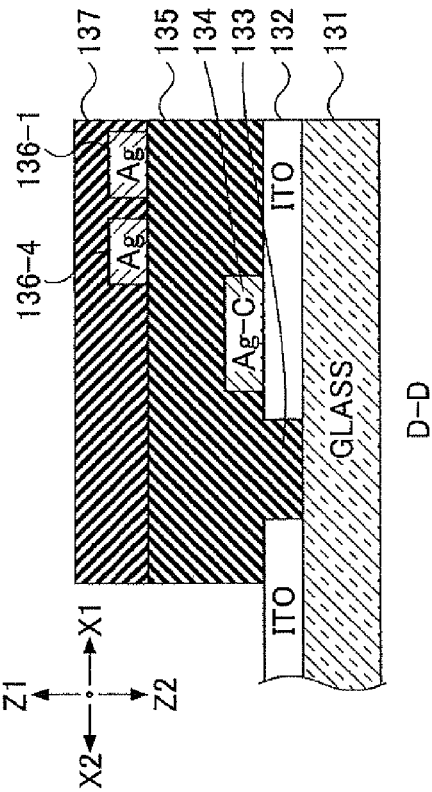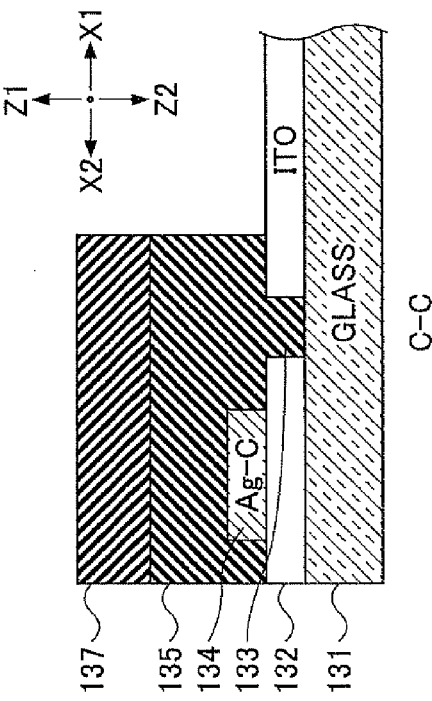

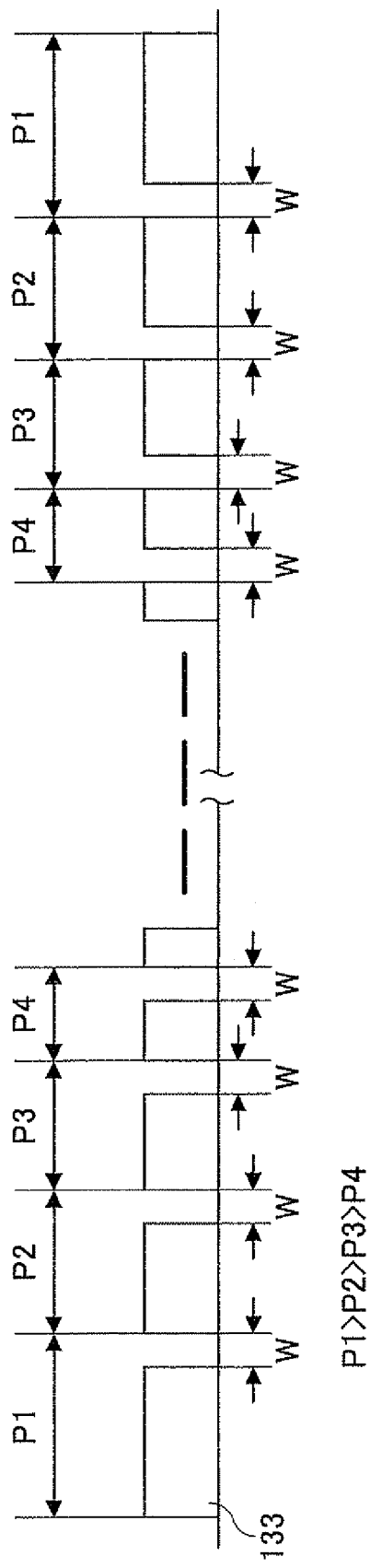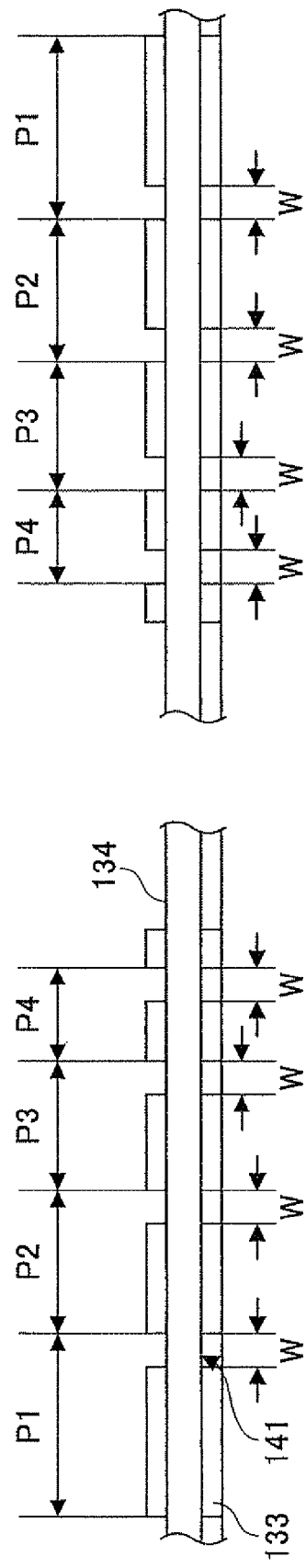

FIG.7A
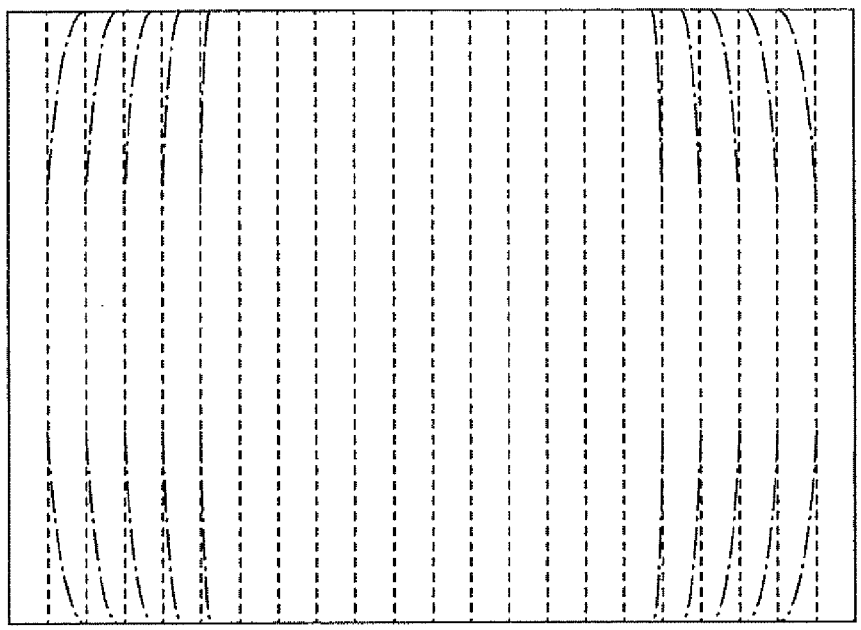
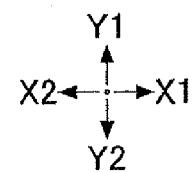
FIG.7B
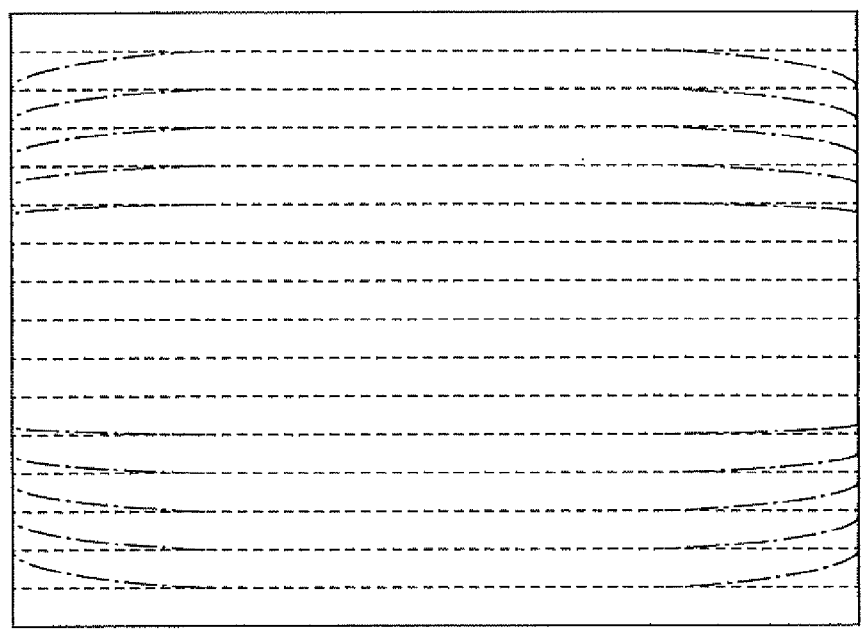
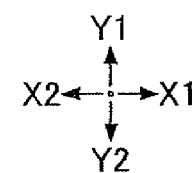

METHOD OF MANUFACTURING A COORDINATE DETECTOR

BACKGROUND OF THE INVENTION

1. Field of the Invention

The present invention relates generally to methods of manufacturing a coordinate detector, and more particularly to a method of manufacturing a coordinate detector configured to detect the coordinates of an input position and output a signal corresponding to the coordinates of the input position.

2. Description of the Related Art

Examples of input devices for computer systems include touch panels. The touch panel is mounted on a display, and can detect a coordinate position on the display and obtain a detection signal corresponding to the coordinate position. The touch panel allows direct, simple, and intuitive inputting.

Various systems are proposed for touch panels, such as those using resistive films, those using optical imaging, and those using capacitive coupling. Commonly used are touch panels of a resistive-film type, which are simple in structure and easy to control. There are several types of low-resistance-system touch panels depending on the arrangement of electrodes on resistive films, such as a four-wire type, a five-wire type, and an eight-wire type.

Of those, compared with four-wire or eight-wire resistive-film touch panels, five-wire touch panels are free of the problem of edge sliding, which is a defect in the four-wire type and the eight-wire type, because the conductive film of the upper substrate placed on the operation surface side is used only for reading an electric potential. Therefore, five-wire touch panels are used in an environment of hard usage or where a long useful service life is desired.

FIG. 1 is a diagram illustrating a five-wire resistive-film touch panel.

Referring to FIG. 1, a five-wire resistive-film touch panel 1 includes an upper substrate 11 and a lower substrate 12.

The lower substrate 12 includes a glass substrate 21 and a transparent resistive film 22 formed on the entire surface of the glass substrate 21. X-coordinate detection electrodes 23 and 24 for detecting coordinates of the x-axis and y-coordinate detection electrodes 25 and 26 for detecting coordinates of the y-axis are formed on the transparent resistive film 22.

The upper substrate 11 includes a film substrate 31 and a transparent resistive film 32 formed on the film substrate 31. A coordinate detection electrode 33 for detecting coordinates is formed on the transparent resistive film 32.

First, application of voltage to the x-coordinate detection electrodes 23 and 24 causes a distribution of electric potential in the directions of the x-axis of the transparent resistive film 22 on the lower substrate 12. At this point, the x-coordinate of a position where the upper substrate 11 contacts the lower substrate 12 can be detected by detecting the electric potential in the transparent resistive film 22 of the lower substrate 12.

Next, application of voltage to the y-coordinate detection electrodes 25 and 26 causes a distribution of electric potential in the directions of the y-axis of the transparent resistive film 22 on the lower substrate 12. At this point, the y-coordinate of the position where the upper substrate 11 contacts the lower substrate 12 can be detected by detecting the electric potential in the transparent resistive film 22 of the lower substrate 12.

At this point, how to distribute electric potential uniformly in the transparent resistive film 22 of the lower substrate 12 becomes an issue in this type of touch panel. Patent Document 1 (listed below) discloses providing peripheral electric potential distribution correction patterns in multiple stages for a uniform distribution of electric potential in the transparent resistive film 22 of the lower substrate 12.

Patent Document 2 (listed below) discloses providing a common electrode so as to encircle an input surface. Patent Document 3 (listed below) discloses forming an opening in an insulating film provided on a transparent resistive film and applying an electric potential through the opening.

[Patent Document 1] Japanese Laid-Open Patent Application No. 10-83251
[Patent Document 2] Japanese Laid-Open Patent Application No. 2001-125724
[Patent Document 3] Japanese Laid-open Patent Application No. 2007-25904

It is desired that coordinate detectors have narrower frames because of reduction in the size of apparatuses on which coordinate detectors are to be mounted. However, it is difficult to narrow the frame of the coordinate detector described in Patent Document 1 because electric potential distribution correction patterns are provided in multiple stages in the periphery.

According to the method described in Patent Document 2, which provides a common electrode around the input surface, there is a problem in that the distribution of electric potential in the transparent resistive film is disturbed unless the ratio of the resistance of the transparent resistive film to the pattern resistance is high.

Further, according to the method described in Patent Document 3, which provides an opening in the insulating film that has been formed, the above-described problems can be solved, but the manufacturing process becomes complicated. In particular, variations in material resistances or variations in resistance during manufacture may cause a decrease in the yield of product manufacturing.

SUMMARY OF THE INVENTION

Embodiments of the present invention may solve or reduce one or more of the above-described problems.

According to one embodiment of the present invention, a method of manufacturing a coordinate detector is provided that can manufacture a narrow-frame coordinate detector with higher coordinate position detection accuracy with high yields.

According to one embodiment of the present invention, a method of manufacturing a coordinate detector having a resistive film and a common electrode for applying a voltage to the resistive film is provided that includes the steps of: (a) applying a photoresist onto the resistive film formed on a substrate formed of an insulator; (b) forming a resist pattern on the resistive film by exposing the applied photoresist to light through a predetermined mask and subsequently developing the applied photoresist; (c) forming a resistive film removal region by removing a portion of the resistive film without the resist pattern; (d) removing the resist pattern after step (c); and (e) forming the common electrode over the resistive film removal region after step (d).

According to one embodiment of the present invention, a method of manufacturing a coordinate detector having a resistive film and a common electrode for applying a voltage to the resistive film is provided that includes the steps of: (a) applying a photoresist onto the resistive film formed on a substrate formed of an insulator; (b) forming a resist pattern on the resistive film by exposing the applied photoresist to light through a predetermined mask and subsequently developing the applied photoresist; and (c) forming a resistive film removal region by removing a portion of the resistive film without the resist pattern, wherein the common electrode is formed between a peripheral edge of the resistive film and the resistive film removal region so that a distance between adjacent sides of the common electrode and the resistive film removal region is more than or equal to 0 mm and less than or equal to 5 mm.

According to one embodiment of the present invention, a method of manufacturing a coordinate detector having a resistive film and a common electrode for applying a voltage to the resistive film is provided that includes the steps of: (a) printing an etching paste on a portion of the resistive film formed on a substrate formed of an insulator, the portion being to be removed to form a resistive film removal region; (b) removing the portion of the resistive film with the etching paste by heat treatment; (c) removing the remaining etching paste after the heat treatment; and (d) forming the common electrode over the resistive film removal region.

According to one embodiment of the present invention, a method of manufacturing a coordinate detector having a resistive film and a common electrode for applying a voltage to the resistive film is provided that includes the steps of: (a) printing an etching paste on a portion of the resistive film formed on a substrate formed of an insulator, the portion being to be removed to form a resistive film removal region; (b) removing the portion of the resistive film with the etching paste by heat treatment; and (c) removing the remaining etching paste after the heat treatment, wherein the common electrode is formed between a peripheral edge of the resistive film and the resistive film removal region so that a distance between adjacent sides of the common electrode and the resistive film removal region is more than or equal to 0 mm and less than or equal to 5 mm.

BRIEF DESCRIPTION OF THE DRAWINGS

Other objects, features and advantages of the present invention will become more apparent from the following detailed description when read in conjunction with the accompanying drawings, in which:

FIGS. 3A through 3E are diagrams illustrating a lower substrate of a panel part according to the first embodiment of the present invention;

FIGS. 4A and 4B are plan views of part of electric potential application parts according to the first embodiment of the present invention;

FIGS. 7A and 7B are diagrams illustrating electric potential distributions of the lower substrate according to the first embodiment of the present invention;

DETAILED DESCRIPTION OF THE PREFERRED EMBODIMENTS

A description is given below, with reference to the accompanying drawings, of embodiments of the present invention.

(a) First Embodiment

A description is given of a first embodiment of the present invention. This embodiment relates to a method of manufacturing a coordinate detector. First, a description is given of a coordinate detector manufactured according to this embodiment.

[System Configuration]

Figure 1:
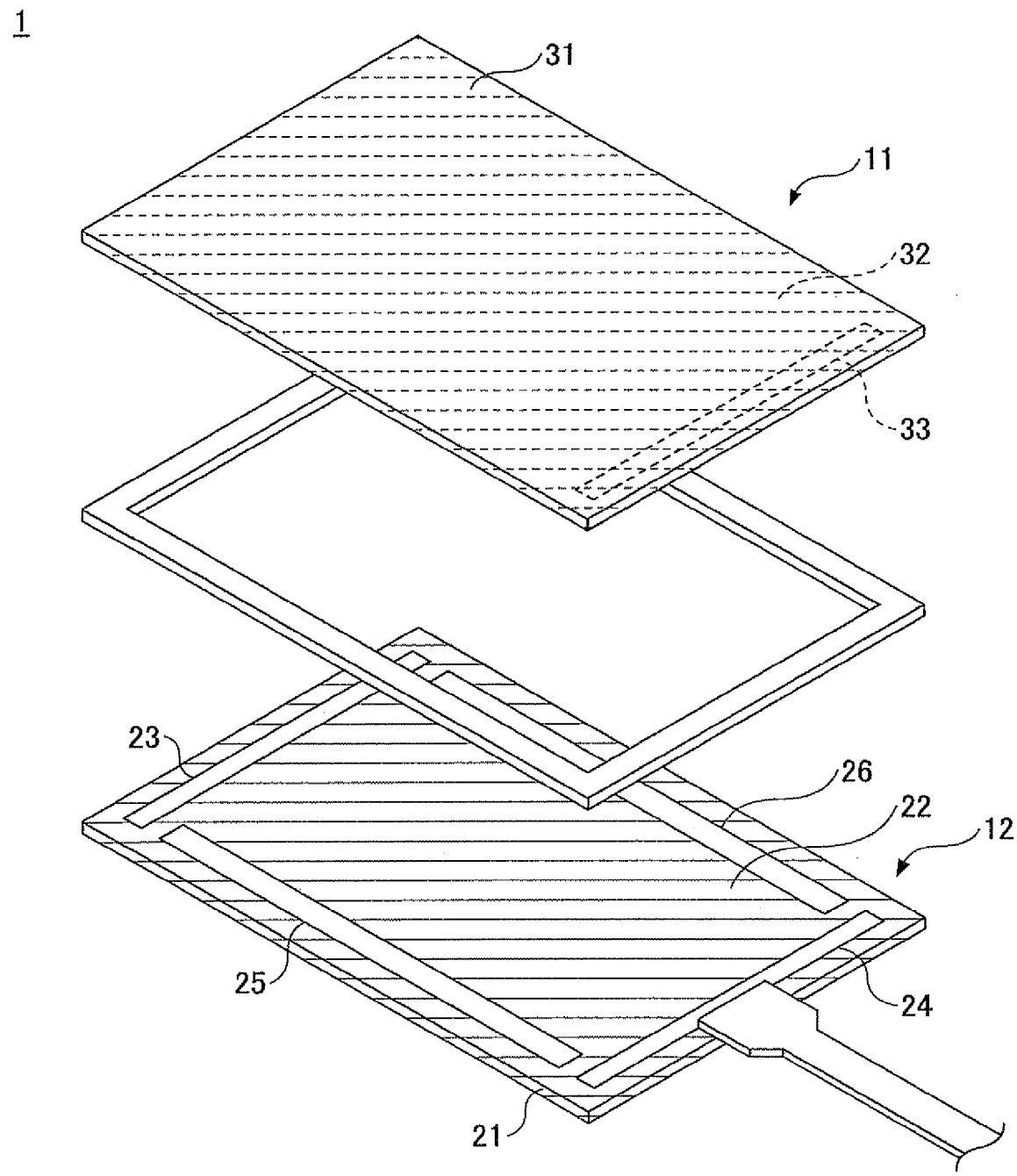
FIG. 1 is a diagram illustrating a five-wire resistive-film touch panel.
Figure 2:
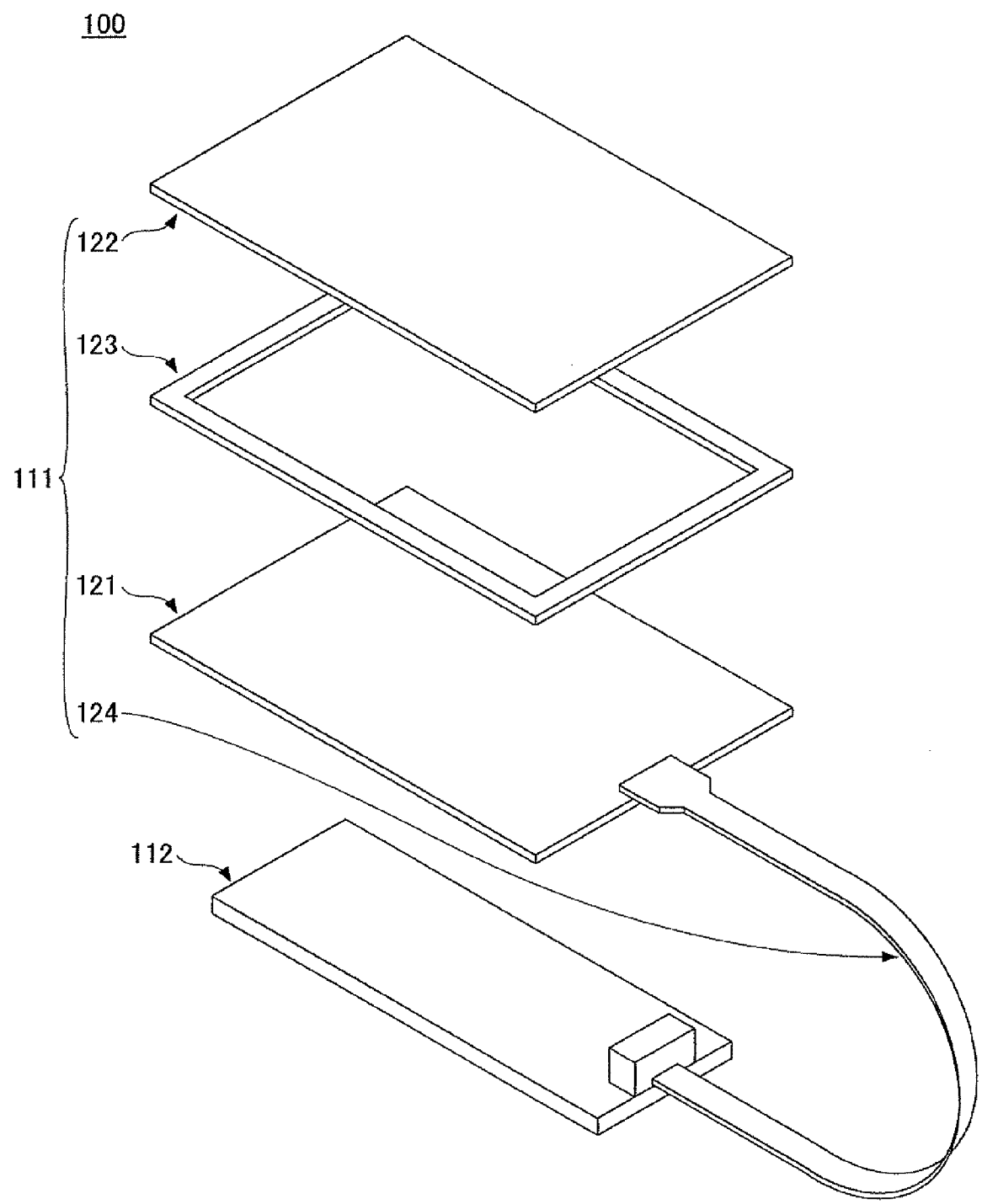
FIG. 2 is a diagram illustrating a system configuration of a coordinate detector manufactured according to a first embodiment of the present invention.

FIG. 2 is a diagram illustrating a system configuration in a coordinate detector according to this embodiment. In this embodiment, a description is given of a so-called five-wire analog resistive-film touch panel as a coordinate input system 100. The coordinate input system 100 according to this embodiment includes a panel part 111 and an interface board 112.

The panel part 111 includes a lower substrate 121, an upper substrate 122, a spacer 123, and a flexible printed circuit (FPC) cable 124. The lower substrate 121 and the upper substrate 122 are adhered through the spacer 123. The spacer 123, which is formed of an insulating double-faced tape or the like, bonds the lower substrate 121 and the upper substrate 122 together with a predetermined gap between the lower substrate 121 and the upper substrate 122. The FPC cable 124, which has first through five interconnects (not graphically illustrated) formed on a flexible printed board (not graphically illustrated), is connected to the lower substrate 121 by bonding an anisotropic conductive film thereto by thermocompression bonding.

[Lower Substrate 121]

Next, a description is given, with reference to FIGS. 3A through 3E, of a configuration of the lower substrate 121.

FIG. 3A is a plan view of the lower substrate 121. FIG. 3B is a cross-sectional view of the lower substrate 121 taken along the line A-A of FIG. 3A. FIG. 3C is a cross-sectional view of the lower substrate 121 taken along the line B-B of FIG. 3A. FIG. 3D is a cross-sectional view of the lower substrate 121 taken along the line C-C of FIG. 3A. FIG. 3E is a cross-sectional view of the lower substrate 121 taken along the line D-D of FIG. 3A.

The lower substrate 121 includes a glass substrate 131, a transparent resistive film 132, resistive film removal regions 133, a common electrode 134, a first insulating film 135, interconnects 136-1, 136-2, 136-3, and 136-4, and a second insulating film 137. The interconnects 136-1 through 136-4 may also be denoted collectively by reference numeral 136.

The transparent resistive film 132 is formed over the substantially entire surface of the glass substrate 131. The transparent resistive film 132, which is formed by depositing ITO (Indium Tin Oxide) or the like by a method such as vacuum evaporation, is a film that transmits visible light and has a predetermined resistance. According to this embodiment, all of the transparent resistive film 132 may be, but does not have to be, removed in the resistive film removal regions 133. That is, the transparent resistive film 132 may be partly removed in the resistive film removal regions 133. The electrical insulation between the transparent resistive film 132 remaining inside the resistive film removal region 133 and the transparent resistive film 132 outside the resistive film removal region 133 may be provided by removing a portion of the transparent resistive film 132 in the periphery of the resistive film removal region 133. Thus, the resistive film removal region 133 may be formed of, for example, a linear region where the transparent resistive film 132 is absent and the transparent resistive film 132 surrounded by, or inside, the linear region. In FIGS. 3B through 3E, reference numeral 133 denotes this linear region for convenience of graphical representation.

By thus providing electrical insulation between the transparent resistive film 132 inside the resistive film removal region 133 and the transparent resistive film 132 outside the resistive film removal region 133, the same effect as in the case of removing the entire transparent resistive film 132 inside the resistive film removal region 133 can be produced. Compared with the case of removing the entire transparent resistive film 132 inside the resistive film removal region 133, the throughput increases because the transparent resistive film 132 removed is reduced in amount.

[Resistive Film Removal Region 133]

The resistive film removal regions 133 are provided in regions where the common electrode 134 is formed in the peripheral part of the glass substrate 131. The common electrode 134 is formed on the transparent resistive film 132 where the resistive film removal regions 133 are formed. As a result, the common electrode 134 and the transparent resistive film 132 between each adjacent two of the resistive film removal regions 133 are connected to form electric potential application parts 141.

According to this embodiment, as illustrated in FIG. 4A, the resistive film removal regions 133 are formed at equal intervals W. That is, as described below, the electric potential application parts 141, each formed between corresponding adjacent two of the resistive film removal regions 133, are formed with the same width. The resistive film removal regions 133 are formed at a relatively wide (large) pitch around the ends of each of a first side 171-1, a second side 171-2, a third side 171-3, and a fourth side 171-4 of the lower substrate 121, and the pitch becomes narrower (smaller) toward the center of each of the first through fourth sides 171-1 through 171-4. For example, the resistive film removal regions 133 are formed at a pitch that varies (narrows) from P1 to P2 to P3 to P4 . . . (P1>P2>P3>P4 . . . ) from each end toward the center as illustrated in FIG. 4A.

[Electric Potential Application Part 141]

Each electric potential application part 141 is formed in the contact region of the transparent resistive film 132 and the common electrode 134 between corresponding adjacent two of the resistive film removal regions 133. According to this embodiment, referring to FIG. 4B, the electric potential application parts 141 are formed at a relatively wide (large) pitch around the ends of each of the first side 171-1, the second side 171-2, the third side 171-3, and the fourth side 171-4 of the lower substrate 121, and are formed at a relatively narrow (small) pitch in the center of each of the first through fourth sides 171-1 through 171-4. This configuration reduces the distortion of a distribution of electric potential in the first side 171-1, the second side 171-2, the third side 171-3, and the fourth side 171-4, where the distribution of electric potential is likely to be distorted inward greatly, thus enabling a uniform distribution of electric potential in the transparent resistive film 132. As a result, it is possible to detect coordinate positions with greater accuracy.

The shape of the electric potential application parts 141 is not limited to the shape illustrated in FIG. 4B. For example, the contact area of the transparent resistive film 132 and the common electrode 134 may be varied by removing part of the transparent resistive film 132 so as to narrow (decrease) toward the ends and widen (increase) toward the center of each of the first side 171-1, the second side 171-2, the third side 171-3, and the fourth side 171-4 of the lower substrate 121.

[Common Electrode]

The common electrode, which is formed of, for example, Ag—C, is formed in the resistive film removal regions 133 and on the transparent resistive film 132 between each adjacent two of the resistive film removal regions 133.

[First Insulating Film 135]

The first insulating film 135 is stacked (formed) on the resistive film removal regions 133 so as to cover the common electrode 134. A first through hole 151-1, a second through hole 151-2, a third through hole 151-3, and a fourth through hole 151-4 are formed in the first insulating film 135 at the corresponding (four) corners of the lower substrate 121. The first through fourth through holes 151-1 through 151-4 form a drive voltage application part.

[First through Fourth Interconnects 136-1 through 136-4]

The first interconnect 136-1, which is formed of, for example, a low resistance material such as Ag, is formed on the first insulating film 135 along the first side 171-1 of the lower substrate 121. The first interconnect 136-1 is formed so as to fill in the first through hole 151-1 formed in the first insulating film 135. Further, the first interconnect 136-1 is connected to the first interconnect of the FPC cable 124 (FIG. 2).

The second interconnect 136-2, which is formed of, for example, a low resistance material such as Ag, is formed on the first insulating film 135 along the second side 171-2, opposed to the first side 171-1, of the lower substrate 121. The second interconnect 136-2 is formed so as to fill in the second through hole 151-2 formed in the first insulating film 135. Further, the second interconnect 136-2 is connected to the second interconnect of the FPC cable 124 (FIG. 2).

The third interconnect 136-3, which is formed of, for example, a low resistance material such as Ag, is formed on the first insulating film 135 along the half of the third side 171-3, perpendicular to the first side 171-1 and the second side 171-2, of the lower substrate 121, which half is on the side of the second side 171-2. The third interconnect 136-3 is formed so as to fill in the third through hole 151-3 formed in the first insulating film 135. Further, the third interconnect 136-3 is connected to the third interconnect of the FPC cable 124 (FIG. 2).

The fourth interconnect 136-4, which is formed of, for example, a low resistance material such as Ag, is formed on the first insulating film 135 along the half of the third side 171-3, perpendicular to the first side 171-1 and the second side 171-2, of the lower substrate 121, which half is on the side of the first side 171-1. The fourth interconnect 136-4 is formed so as to fill in the fourth through hole 151-4 formed in the first insulating film 135. Further, the fourth interconnect 136-4 is connected to the fourth interconnect of the FPC cable 124 (FIG. 2).

[Second Insulating Film 137]

The second insulating film 137 is formed on the first insulating film 135 so as to cover the first interconnect 136-1, the second interconnect 136-2, the third interconnection 136-3, and the fourth interconnect 136-4. Further, the upper substrate 122 is bonded to (the upper surface of) the second insulating film 137 through the spacer 123 (FIG. 2).

[Upper Substrate 122]

Figure 5A:
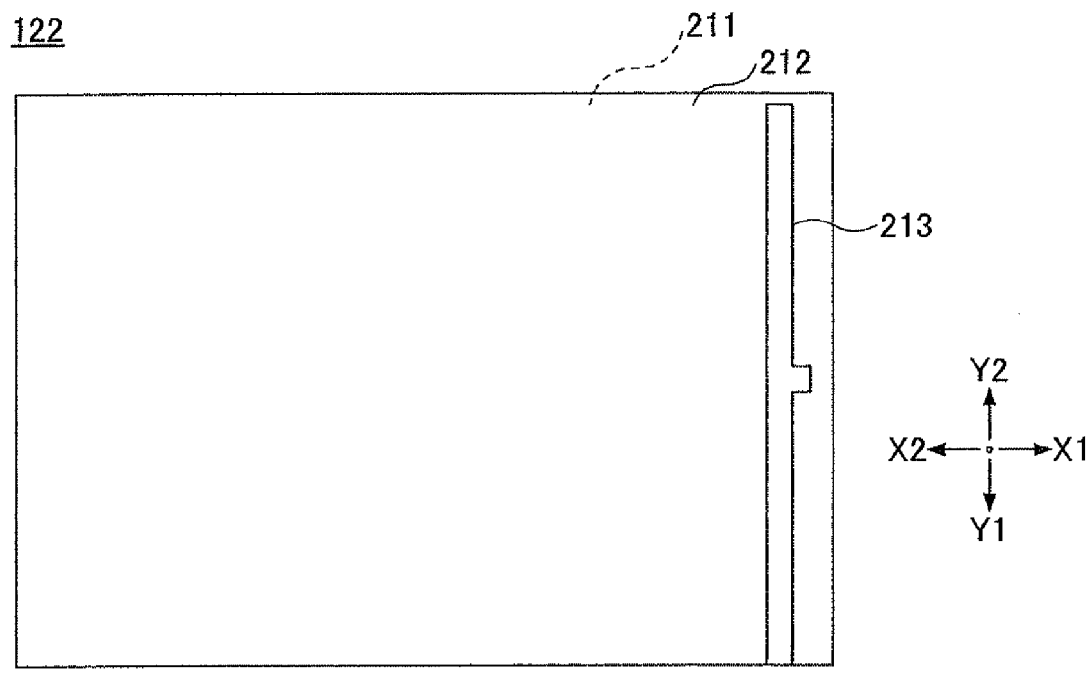
FIGS. 5A and 5B are diagrams illustrating an upper substrate of the panel part according to the first embodiment of the present invention.
Figure 5B:
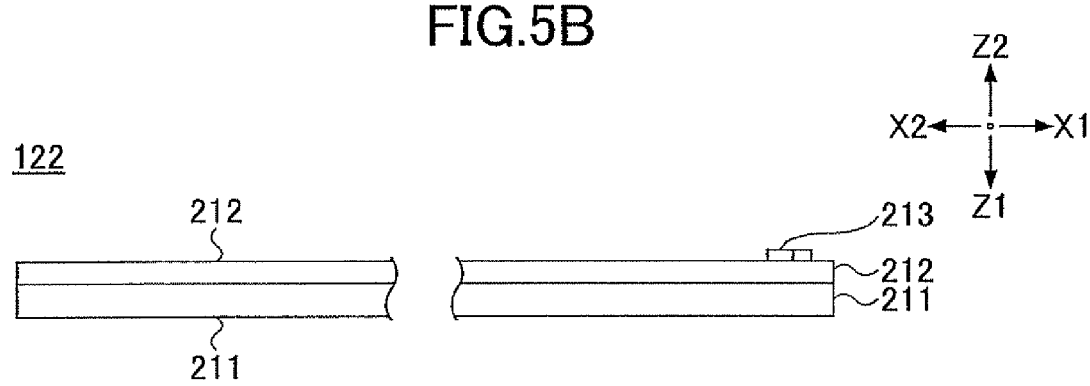

Next, a description is given, with reference to FIGS. 5A and 5B, of a configuration of the upper substrate 122.

FIG. 5A is a plan view of the upper substrate 122. FIG. 5B is a cross-sectional view of the upper substrate 122.

The upper substrate 122 includes a film substrate 211, a transparent resistive film 212, and an electrode 213. The film substrate 211 is formed of, for example, a flexible resin film such as a polyethylene terephthalate (PET) film. The transparent resistive film 212 is formed over the entire surface of the film substrate 211 on the side facing toward the lower substrate 121. The transparent resistive film 212 is formed of a transparent conductive material such as ITO. The electrode 213 is placed at the X1 end on the transparent resistive film 212 of the upper substrate 122. The electrode 213 is connected to the fifth interconnect of the FPC cable 124 (FIG. 2), which is connected to the lower substrate 121 through a contact (not graphically illustrated). Coordinate positions are detected by detecting the electric potential of the lower substrate 121 with the interface board 112 (FIG. 2) using this upper substrate 122 as a probe.

[Detection Process]

Next, a description is given of a process for detecting a coordinate position in a coordinate detector according to this embodiment.

Figure 6:
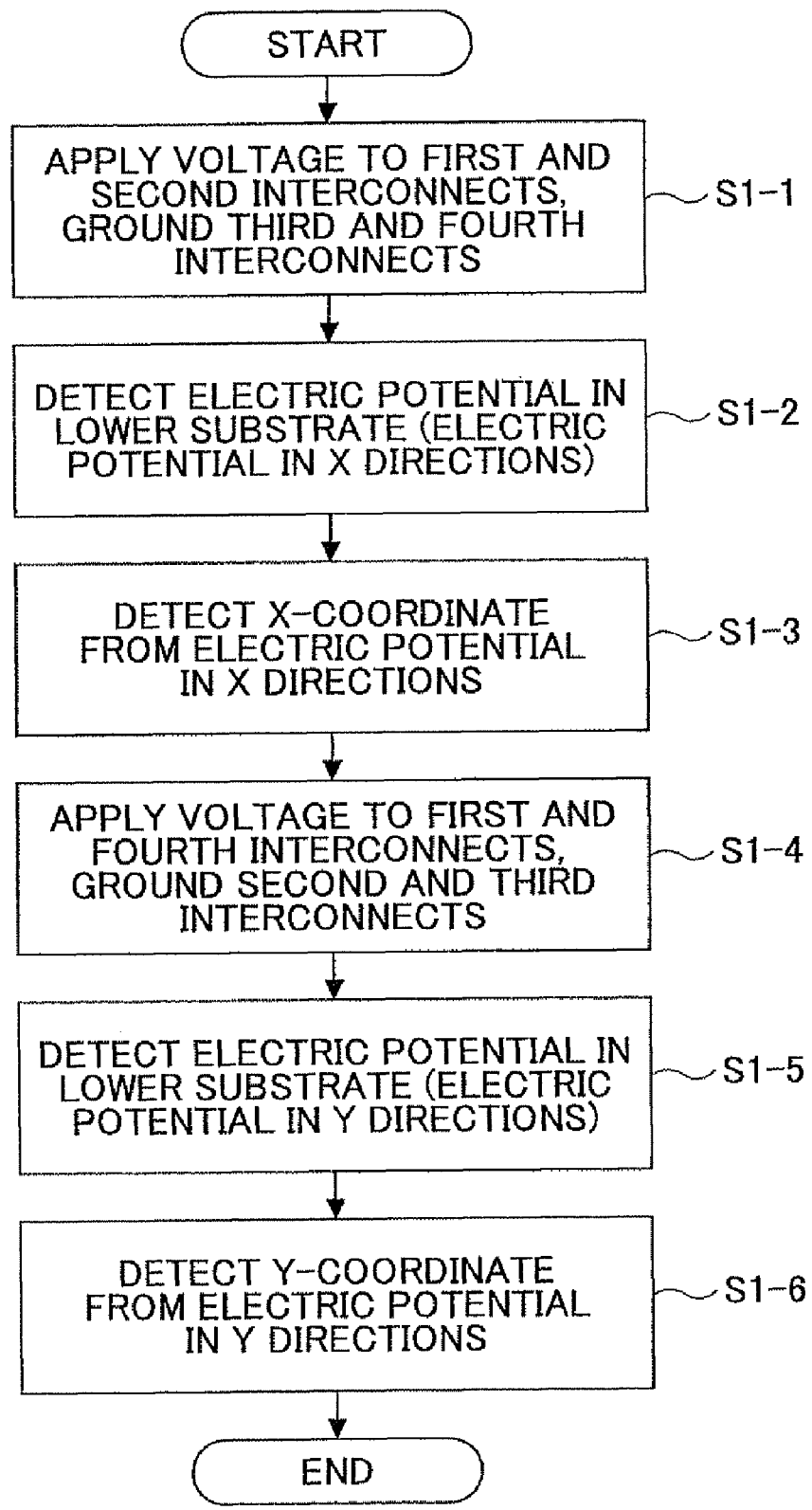
FIG. 6 is a processing flowchart of an interface board according to the first embodiment of the present invention.

FIG. 6 is a flowchart showing processing performed by the interface board 112. FIGS. 7A and 7B are diagrams illustrating electric potential distributions of the lower substrate 121. FIG. 7A is a diagram illustrating an electric potential distribution at the time of detecting an x-coordinate, and FIG. 7B is a diagram illustrating an electric potential distribution at the time of detecting a y-coordinate.

In step S1-1, the interface board 112 applies a voltage Vx to the first interconnect 136-1 and the second interconnect 136-2, and grounds the third interconnect 136-3 and the fourth interconnect 136-4. Thereby, a uniform electric potential distribution can be generated in the transparent resistive film 132 as indicated by broken lines in FIG. 7A. The conventional electric potential distribution is distorted as indicated by single-dot chain lines in FIG. 7A. Therefore, according to this embodiment, it is possible to detect an exact x-coordinate.

Next, in step S1-2, the interface board 112 detects the electric potential of the lower substrate 121. Then, in step S1-3, the interface board 112 detects an x-coordinate corresponding to the electric potential of the lower substrate 121.

Next, in step S1-4, the interface board 112 applies a voltage Vy to the first interconnect 136-1 and the fourth interconnect 136-4, and grounds the second interconnect 136-2 and the third interconnect 136-3. Thereby, a uniform electric potential distribution can be generated in the transparent resistive film 132 as indicated by broken lines in FIG. 7B. The conventional electric potential distribution is distorted as indicated by single-dot chain lines in FIG. 7B. Therefore, according to this embodiment, it is possible to detect an exact y-coordinate.

Next, in step S1-5, the interface board 112 detects the electric potential of the lower substrate 121. Then, in step S1-6, the interface board 112 detects a y-coordinate corresponding to the electric potential of the lower substrate 121.

According to this embodiment, the interconnects 136-1 through 136-4 are stacked over the common electrode 134. Accordingly, it is possible to reduce the frame size of the panel part 111. Further, the electric potential application parts 141 enable the electric potential applied to the transparent resistive film 132 of the lower substrate 121 at the time of detecting an x-coordinate or a y-coordinate to be distributed uniformly in the detection region. Accordingly, it is possible to detect coordinates with greater accuracy.

[Manufacturing Method]

Next, a description is given of a method of manufacturing a coordinate detector according to this embodiment. Specifically, a description is given, with reference to FIGS. 8A through 8H, of a method of manufacturing the lower substrate 121.

Figure 8A:
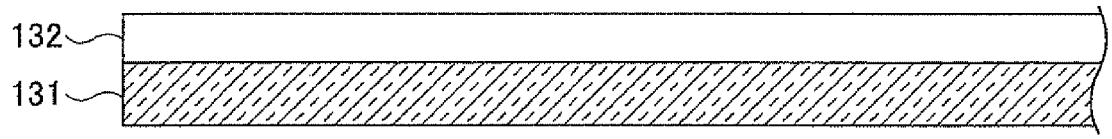
FIGS. 8A through 8H are diagrams illustrating a process for manufacturing the lower substrate according to the first embodiment of the present invention.

First, as illustrated in FIG. 8A, the transparent resistive film 132 of ITO or the like is formed on the glass substrate 131 by a process such as sputtering or vacuum evaporation.

Figure 8B:
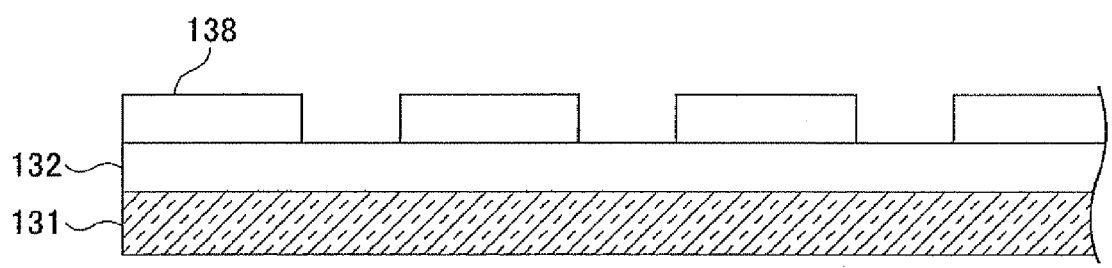

Next, as illustrated in FIG. 8B, a resist pattern 138 is formed on the transparent resistive film 132. For example, photoresist is applied onto the transparent resistive film 132 with a spin coater or the like. Thereafter, the photoresist is prebaked, exposed to light with an exposure unit, and developed. Thereby, the resist pattern 138 is formed. This resist pattern 138 has openings on regions of the transparent resistive film 132, which regions are to be removed to form the resistive film removal regions 133.

Figure 8C:
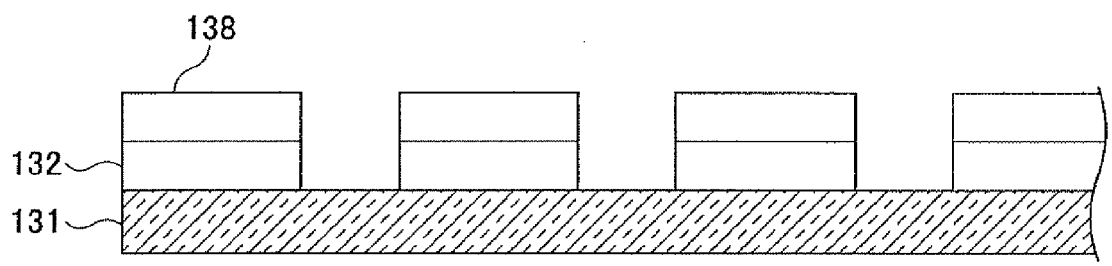

Next, as illustrated in FIG. 8C, chemical etching is performed using an acid solution such as a hydrochloric acid or a phosphoric acid solution. This process is also called wet etching. By this process, the transparent resistive film 132 is removed below the openings of the resist pattern 138. In this embodiment, the transparent resistive film 132 can also be removed by dry etching such as RIE (Reactive Ion Etching) in the same manner as by wet etching.

Figure 8D:
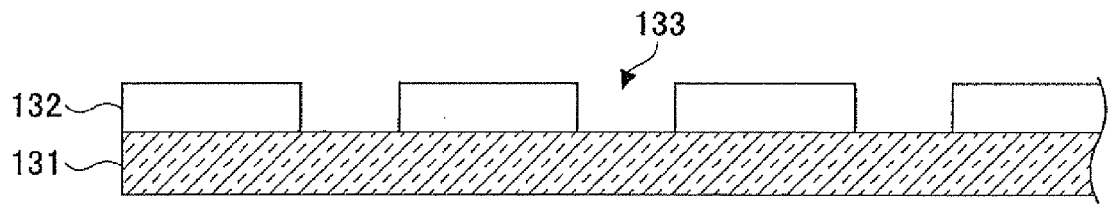

Next, as illustrated in FIG. 8D, the resist pattern 138 is removed with an organic solvent or the like. As a result, the transparent resistive film 132 having the resistive film removal regions 133 formed therein is formed on the glass substrate 131.

Figure 8E:
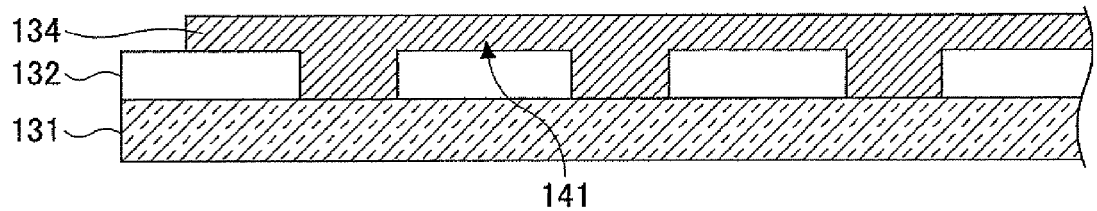

Next, as illustrated in FIG. 8E, the common electrode 134 of Ag—C is formed on the transparent resistive film 132 where the resistive film removal regions 133 are formed. For example, the common electrode 134 is formed by printing a pattern of paste including Ag—C by screen printing and thereafter baking the paste. As a result, the electric potential application part 141 is formed on the transparent resistive film 132 between each adjacent two of the resistive film removal regions 133.

Figure 8F:
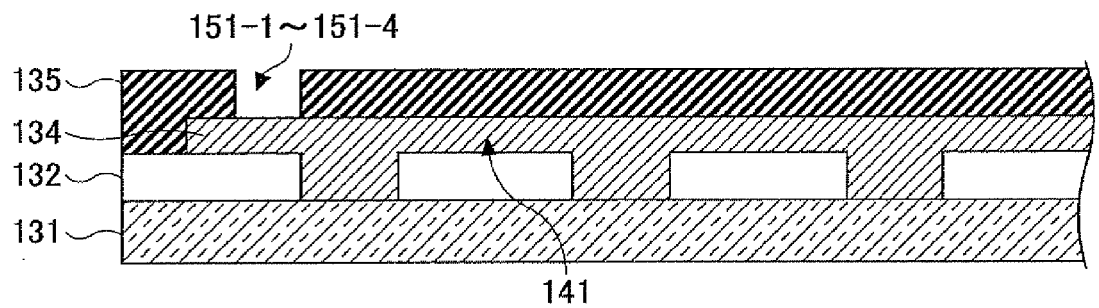

Next, as illustrated in FIG. 8F, the first insulating film 135 having the first through fourth through holes 151-1 through 151-4 is formed. For example, the first insulating film 135 is formed by printing a pattern of insulating paste by screen printing and thereafter baking the insulating paste.

Figure 8G:
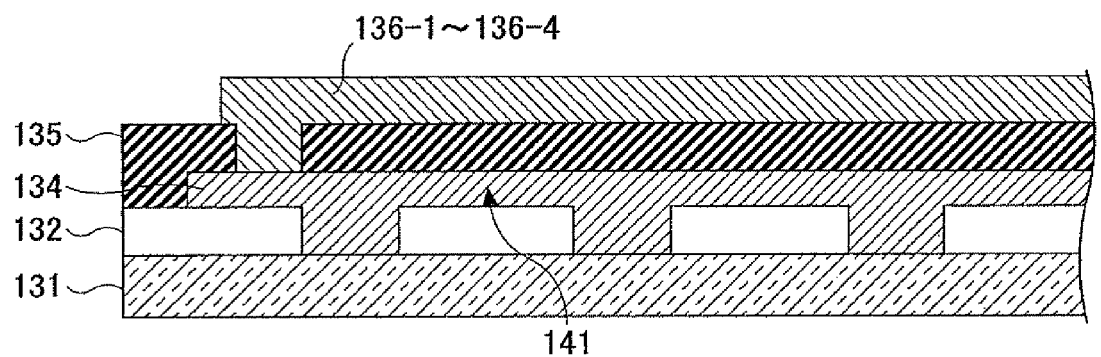

Next, as illustrated in FIG. 8G, the first through fourth Ag interconnects 136-1 through 136-4 are formed on the first insulating film 135. For example, the first through fourth Ag interconnects 136-1 through 136-4 are formed by printing patterns of conductive paste including Ag by screen printing and thereafter baking the conductive paste.

Figure 8H:
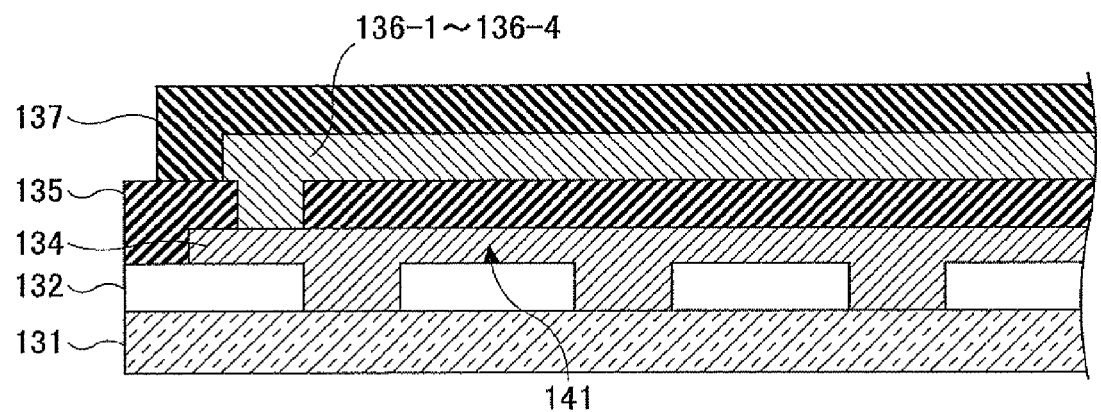

Next, as illustrated in FIG. 8H, the second insulating film 137 is formed. For example, the second insulating film 137 is formed by printing a pattern of insulating paste by screen printing and thereafter baking the insulating paste.

Thereby, the lower substrate 121 is manufactured.

In this embodiment, a description is given of a five-wire resistive-film analog touch panel. However, this embodiment is not limited to this, and is also applicable to other types of touch panels such as four-wire resistive-film touch panels or seven-wire resistive-film touch panels.

(b) Second Embodiment

A description is given of a second embodiment of the present invention. This embodiment relates to a method of manufacturing a coordinate detector, and specifically to a method of manufacturing the above-described lower substrate 121 using etching paste. A description is given below, with reference to FIGS. 9A through 9G, of this embodiment.

Figure 9A:
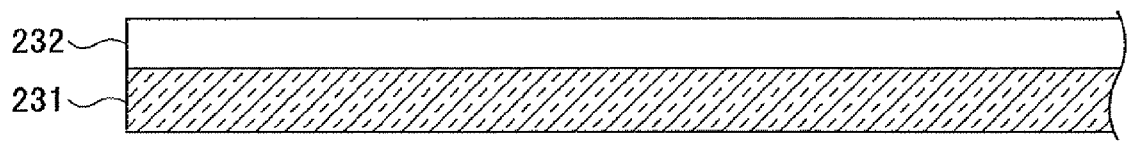
FIGS. 9A through 9G are diagrams illustrating a process for manufacturing the lower substrate according to a second embodiment of the present invention.

First, as illustrated in FIG. 9A, a transparent resistive film 232 of ITO or the like is formed on a glass substrate 231 by a process such as sputtering or vacuum evaporation.

Figure 9B:
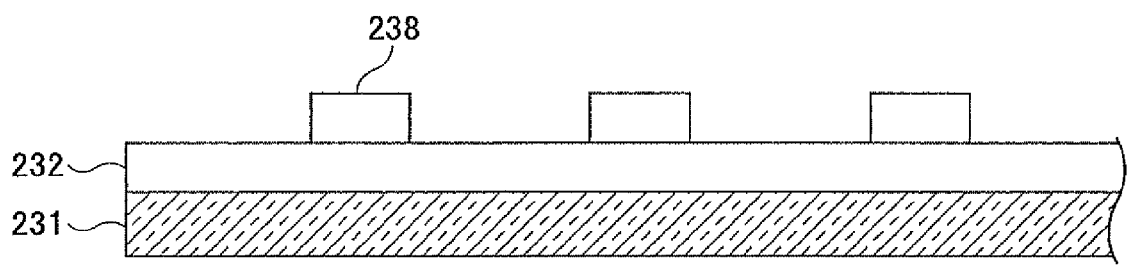

Next, as illustrated in FIG. 9B, etching paste 238 is formed on the transparent resistive film 232. For example, this etching paste 238 is formed by a printing process such as screen printing. The etching paste 238 is formed on resistive film removal regions 233 described below.

Figure 9C:
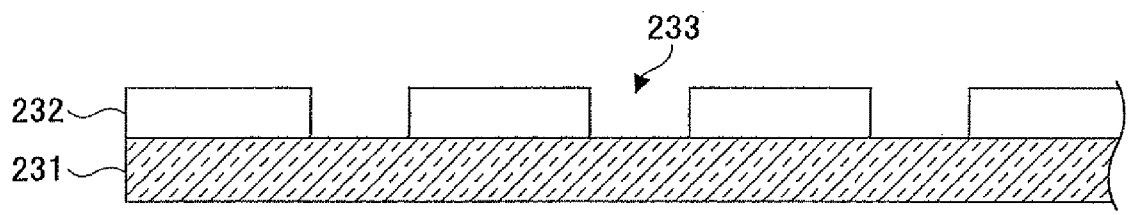

Next, as illustrated in FIG. 9C, the etching paste 238 is removed after heat treatment. For example, the transparent resistive film 232 is removed by heat treatment where the etching paste 238 is formed. Thereafter, the remaining etching paste 238 is removed by cleaning. As a result, the transparent resistive film 232 having the resistive film removal regions 233 formed therein is formed on the glass substrate 231.

Figure 9D:
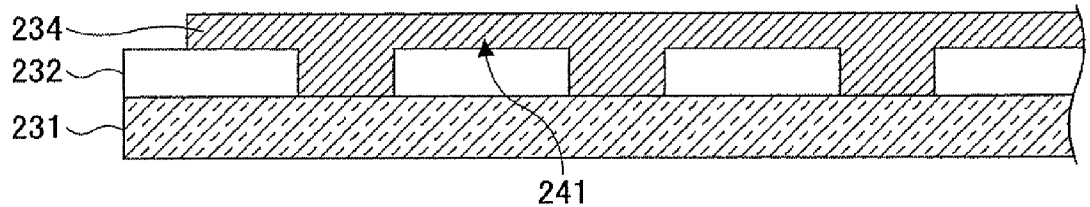

Next, as illustrated in FIG. 9D, a common electrode 234 of Ag—C is formed on the transparent resistive film 232 where the resistive film removal regions 233 are formed. For example, the common electrode 234 is formed by printing a pattern of paste including Ag—C by screen printing and thereafter baking the paste. As a result, an electric potential application part 241 is formed on the transparent resistive film 232 between each adjacent two of the resistive film removal regions 233.

Figure 9E:
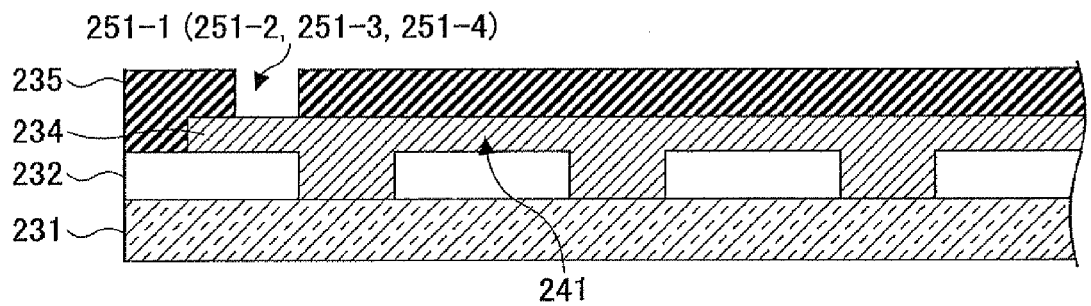

Next, as illustrated in FIG. 9E, a first insulating film 235 having first through fourth through holes 251-1, 251-2, 251-3, and 251-4 is formed. For example, the first insulating film 235 is formed by printing a pattern of insulating paste by screen printing and thereafter baking the insulating paste.

Figure 9F:
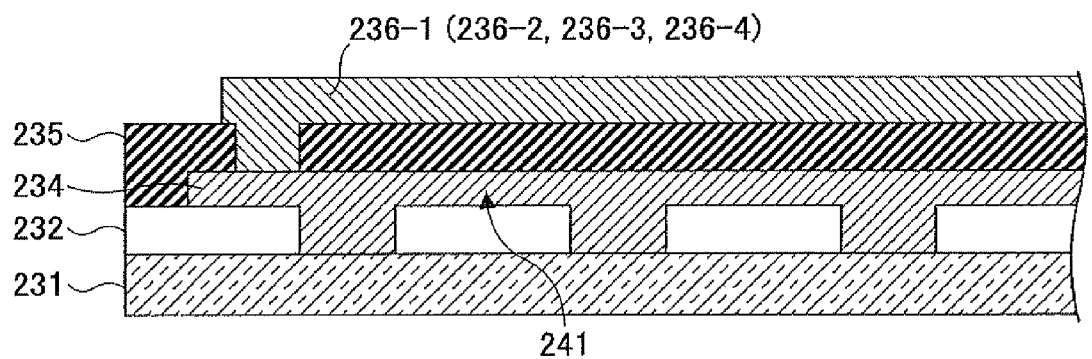

Next, as illustrated in FIG. 9F, first through fourth Ag interconnects 236-1, 236-2, 236-3, and 236-4 are formed on the first insulating film 235. For example, the first through fourth interconnects 236-1 through 236-4 are formed by printing patterns of conductive paste including Ag by screen printing and thereafter baking the conductive paste.

Figure 9G:
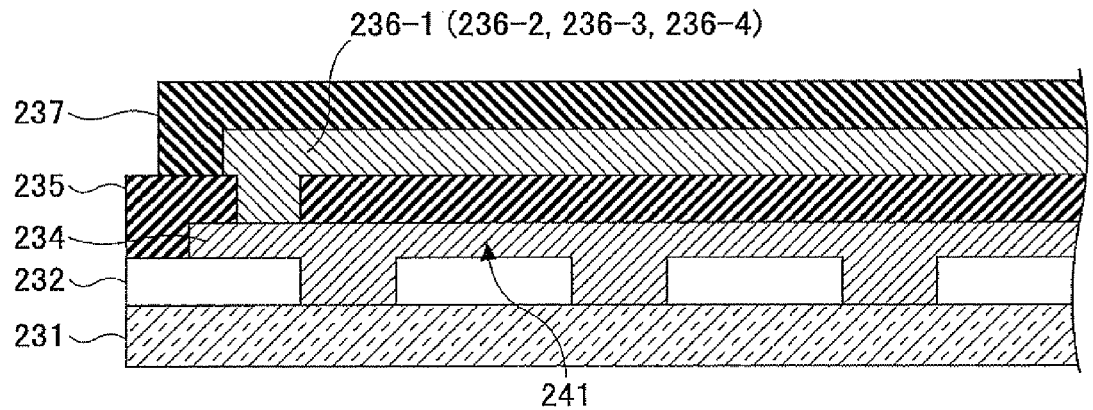

Next, as illustrated in FIG. 9G, a second insulating film 237 is formed. For example, the second insulating film 237 is formed by printing a pattern of insulating paste by screen printing and thereafter baking the insulating paste.

Thereby, the lower substrate 121 can be manufactured. The lower substrate 121 thus manufactured according to this embodiment can also be used as the lower substrate 121 of the coordinate detector of the first embodiment as in the case of the first embodiment.

(c) Third Embodiment

A description is given of a third embodiment. The present embodiment relates to a method of manufacturing a coordinate detector, and specifically to a method of manufacturing the above-described lower substrate 121. A description is given below, with reference to FIGS. 10A through 10D, of this embodiment. FIGS. 10A through 10D are plan views of the lower substrate 121, illustrating its manufacturing process according to this embodiment.

Figure 10A:
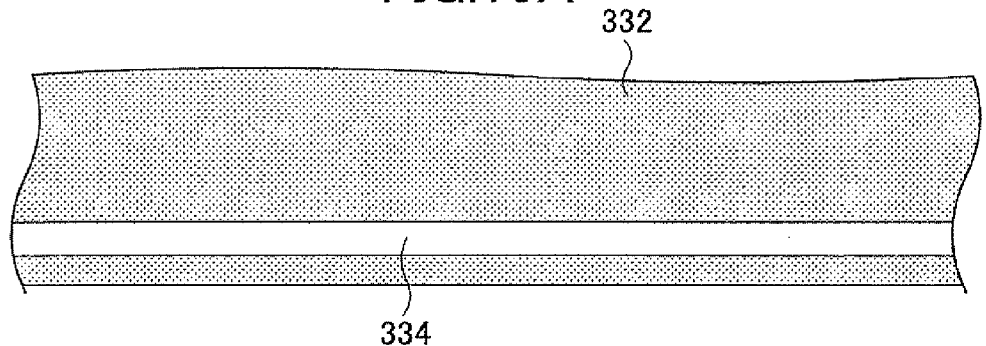
FIGS. 10A through 10D are diagrams illustrating a process for manufacturing the lower substrate according to a third embodiment of the present invention.

First, as illustrated in FIG. 10A, a common electrode 334 is formed on a transparent resistive film 332 of ITO or the like, which is formed on a glass substrate (not graphically illustrated) by a process such as sputtering or vacuum evaporation. For example, the common electrode 334 is formed by printing a pattern of paste including Ag—C by screen printing and thereafter baking the paste.

Figure 10B:
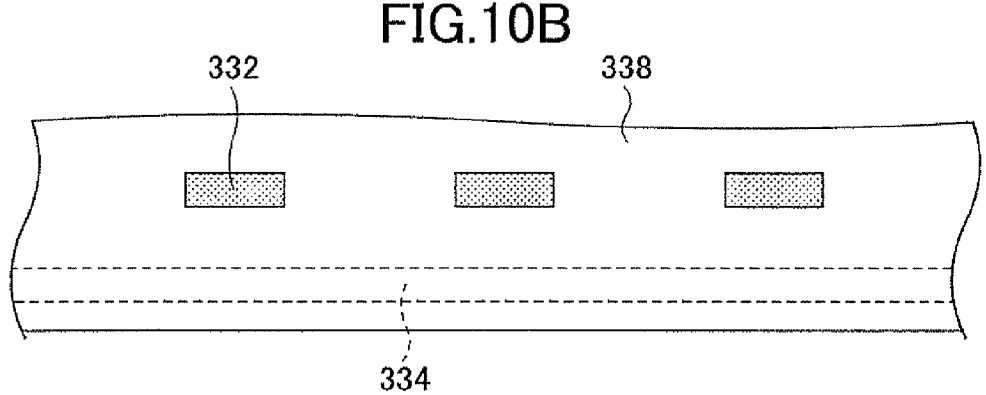

Next, as illustrated in FIG. 10B, a resist pattern 338 is formed on the transparent resistive film 332. For example, photoresist is applied onto the transparent resistive film 332 with a spin coater or the like. Thereafter, the photoresist is prebaked, exposed to light with an exposure unit, and developed. Thereby, the resist pattern 338 is formed. The resist pattern 338 has openings on regions of the transparent resistive film 332, which regions are to be removed to form resistive film removal regions 333 described below. The resistive film removal regions 333 are to be formed inside the common electrode 334, which is provided to extend along the peripheral edge of the transparent resistive film 332 (or of the glass substrate), so that a distance S (FIG. 10D) between the adjacent sides of the common electrode 334 and each resistive film removal region 333, that is, between the internal side of the common electrode 334 and a side of each resistive film removal region 333 facing toward the internal side of the common electrode 334, is more than or equal to 0 mm and less than or equal to 5 mm (0 mm$\leqq$S$\leqq$5 mm).

Figure 10C:
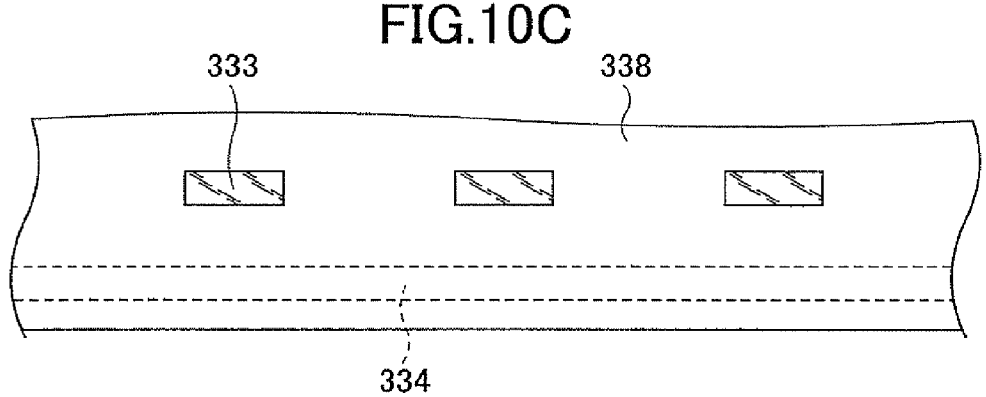

Next, as illustrated in FIG. 10C, chemical etching is performed using an acid solution such as a hydrochloric acid or a phosphoric acid solution. This process is also called wet etching. By this process, the transparent resistive film 332 is removed below the openings of the resist pattern 338, so that the resistive film removal regions 333 are formed. In this embodiment, the transparent resistive film 332 can also be removed by dry etching such as RIE in the same manner as by wet etching.

Figure 10D:
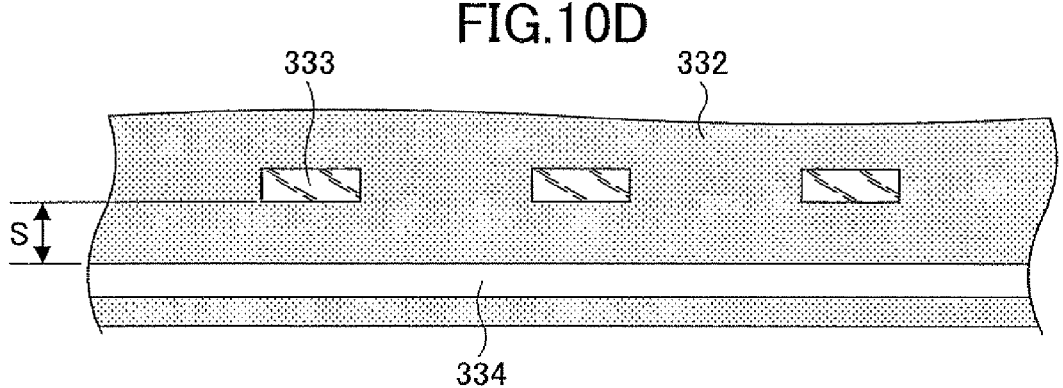

Next, as illustrated in FIG. 10D, the resist pattern 338 is removed with an organic solvent or the like. As a result, the transparent resistive film 332 having the resistive film removal regions 333 formed therein is formed on the glass substrate.

The lower substrate 121 can be manufactured by subsequently forming the first insulating film 135, the first through fourth interconnects 136-1 through 136-4, the second insulating film 137, etc., in the same manner as in the first embodiment. The lower substrate 121 thus manufactured according to this embodiment can also be used as the lower substrate 121 of the coordinate detector of the first embodiment as in the case of the first embodiment. In the lower substrate 121 manufactured according to this embodiment, the common electrode 334 is not formed over the resistive film removal regions 333. However, the electric potential can be distributed uniformly in the transparent resistive film 332 as in the first embodiment by forming the resistive film removal regions 333 inside the common electrode 334. The distance S between the adjacent sides of the common electrode 334 and the resistive film removal regions 333 is more than or equal to 0 mm and less than or equal to 5 mm (0 mm$\leqq$S$\leqq$5 mm), so that this effect is produced.

(d) Fourth Embodiment

Figure 11A:
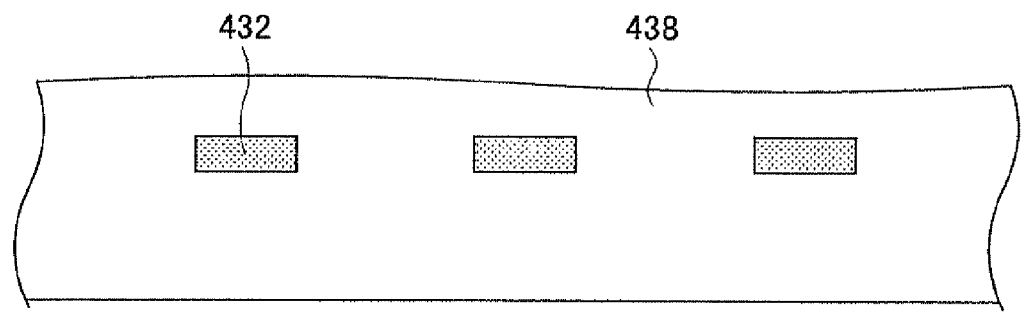
FIGS. 11A through 11C are diagrams illustrating a process for manufacturing the lower substrate according to a fourth embodiment of the present invention.
Figure 11B:
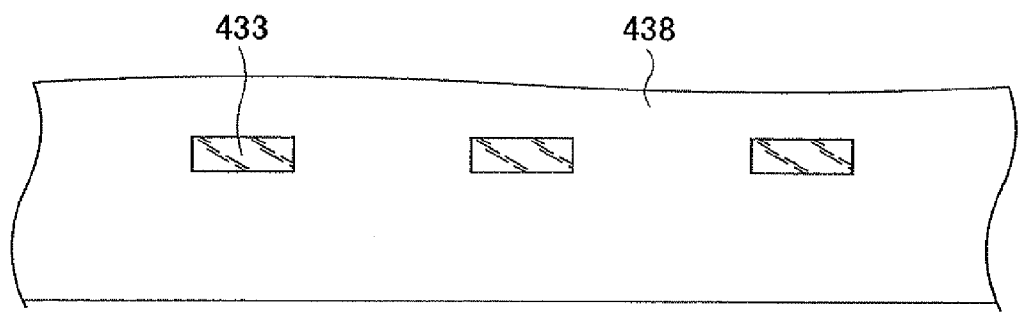
Figure 11C:
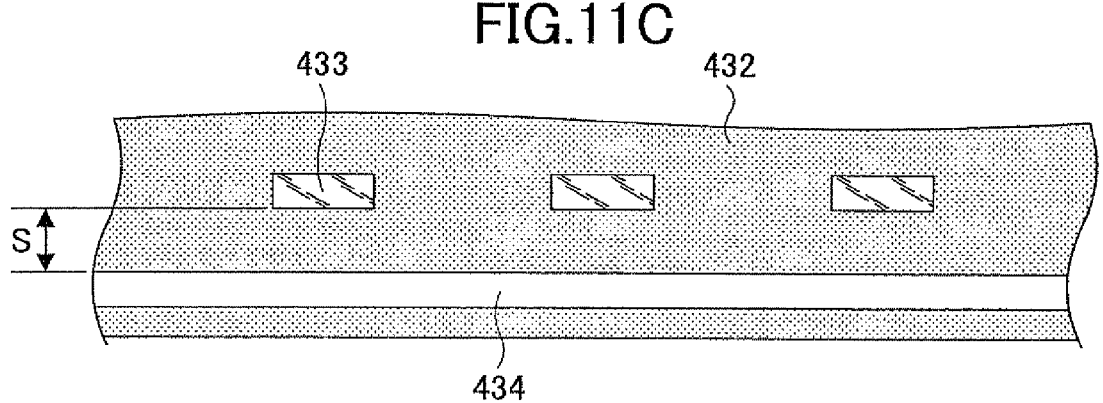

A description is given of a fourth embodiment of the present invention. The present invention relates to a method of manufacturing a coordinate detector, and specifically to a method of manufacturing the above-described lower substrate 121. A description is given below, with reference to FIGS. 11A through 11C, of this embodiment. FIGS. 11A through 11C are plan views of the lower substrate 121, illustrating its manufacturing process according to this embodiment.

First, as illustrated in FIG. 11A, a resist pattern 438 is formed on a transparent resistive film 432 of ITO or the like, which is formed on a glass substrate (not graphically illustrated) by a process such as sputtering or vacuum evaporation.

For example, photoresist is applied onto the transparent resistive film 432 with a spin coater or the like. Thereafter, the photoresist is prebaked, exposed to light with an exposure unit, and developed. Thereby, the resist pattern 438 is formed. The resist pattern 438 has openings on regions of the transparent resistive film 432, which regions are to be removed to form resistive film removal regions 433 described below. The resistive film removal regions 433 are to be formed inside a below-described common electrode 434, which is provided to extend along the peripheral edge of the transparent resistive film 432 (or of the glass substrate), so that a distance S (FIG. 11C) between the adjacent sides of the common electrode 434 and each resistive film removal region 433, that is, between the internal side of the common electrode 434 and a side of each resistive film removal region 433 facing toward the internal side of the common electrode 434, is more than or equal to 0 mm and less than or equal to 5 mm (0 mm$\leq$S$\leq$5 mm).

Next, as illustrated in FIG. 11B, chemical etching is performed using an acid solution such as a hydrochloric acid or a phosphoric acid solution. This process is also called wet etching. By this process, the transparent resistive film 432 is removed below the openings of the resist pattern 438, so that the resistive film removal regions 433 are formed. In this embodiment, the transparent resistive film 432 can also be removed by dry etching such as RIE in the same manner as by wet etching.

Next, as illustrated in FIG. 11C, the resist pattern 438 is removed with an organic solvent or the like, and thereafter, the common electrode 434 is formed. For example, the common electrode 434 is formed by printing a pattern of paste including Ag—C by screen printing and thereafter baking the paste. As a result, the transparent resistive film 432 having the resistive film removal regions 433 formed therein is formed on the glass substrate.

The lower substrate 121 can be manufactured by subsequently forming the first insulating film 135, the first through fourth interconnects 136-1 through 136-4, the second insulating film 137, etc., in the same manner as in the first embodiment. The lower substrate 121 thus manufactured according to this embodiment can also be used as the lower substrate 121 of the coordinate detector of the first embodiment as in the case of the first embodiment. In the lower substrate 121 manufactured according to this embodiment, the common electrode 434 is not formed over the resistive film removal regions 433. However, the electric potential can be distributed uniformly in the transparent resistive film 432 as in the first embodiment by forming the resistive film removal regions 433 inside the common electrode 434. The distance S between the adjacent sides of the common electrode 434 and the resistive film removal regions 433 is more than or equal to 0 mm and less than or equal to 5 mm (0 mm$\leq$S$\leq$5 mm), so that this effect is produced.

(e) Fifth Embodiment

Figure 12A:
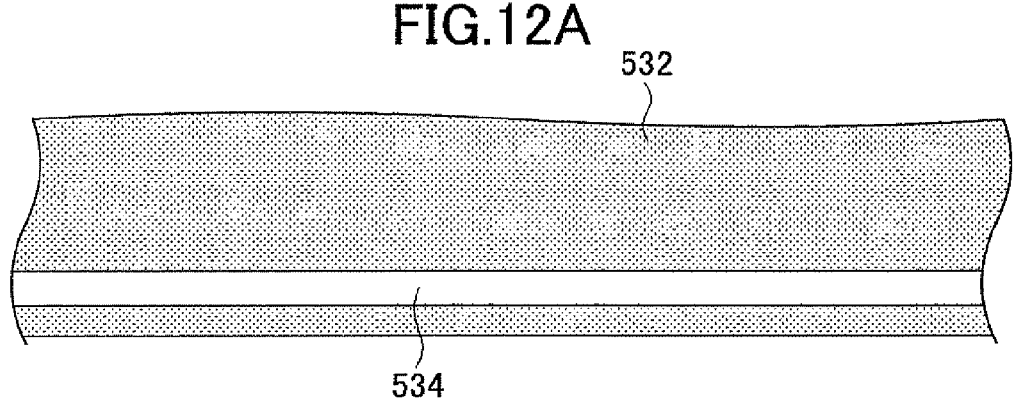
FIGS. 12A through 12C are diagrams illustrating a process for manufacturing the lower substrate according to a fifth embodiment of the present invention.
Figure 12B:
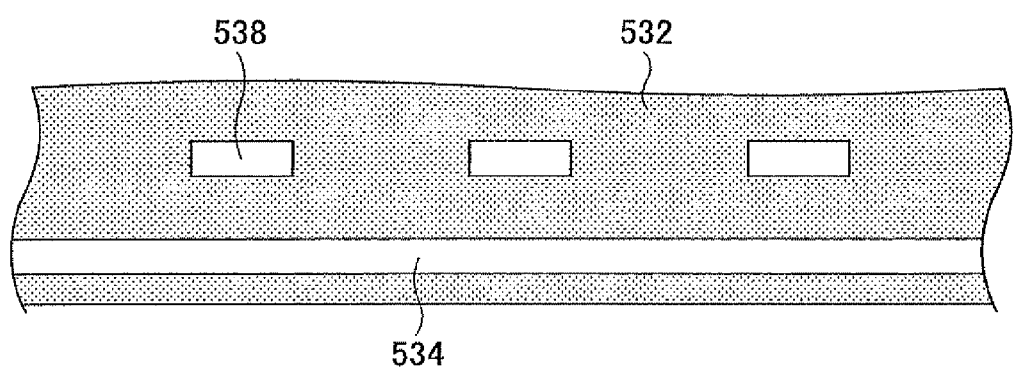
Figure 12C:
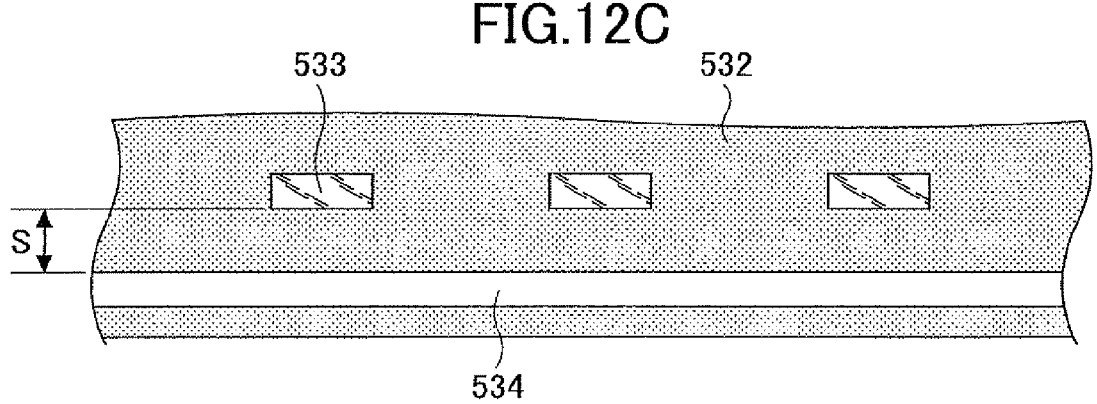

A description is given of a fifth embodiment of the present invention. This embodiment relates to a method of manufacturing a coordinate detector, and specifically to a method of manufacturing the above-described lower substrate 121. A description is given below, with reference to FIGS. 12A through 12C, of this embodiment. FIGS. 12A through 12C are top plan views of the lower substrate 121, illustrating its manufacturing process according to this embodiment.

First, as illustrated in FIG. 12A, a common electrode 534 is formed on a transparent resistive film 532 of ITO or the like, which is formed on a glass substrate (not graphically illustrated) by a process such as sputtering or vacuum evaporation. For example, the common electrode 534 is formed by printing a pattern of paste including Ag—C by screen printing and thereafter baking the paste.

Next, as illustrated in FIG. 12B, etching paste 538 is formed on the transparent resistive film 532. For example, this etching paste 538 is formed by a printing process such as screen printing. The etching paste 538 is formed on resistive film removal regions 533 described below. The etching paste 538 is formed inside the common electrode 534, which is provided to extend along the peripheral edge of the transparent resistive film 532 (or of the glass substrate), so that a distance S (FIG. 12C) between the adjacent sides of the common electrode 534 and each resistive film removal region 533, that is, between the internal side of the common electrode 534 and a side of each resistive film removal region 533 facing toward the internal side of the common electrode 534, is more than or equal to 0 mm and less than or equal to 5 mm (0 mm$\leq$S$\leq$5 mm).

Next, as illustrated in FIG. 12C, the transparent resistive film 532 is removed by heat treatment where the etching paste 538 is formed. Thereafter, the remaining etching paste 538 is removed by cleaning. As a result, the transparent resistive film 532 having the resistive film removal regions 533 formed therein is formed on the glass substrate.

The lower substrate 121 can be manufactured by subsequently forming the first insulating film 135, the first through fourth interconnects 136-1 through 136-4, the second insulating film 137, etc., in the same manner as in the first embodiment. The lower substrate 121 thus manufactured according to this embodiment can also be used as the lower substrate 121 of the coordinate detector of the first embodiment as in the case of the first embodiment. In the lower substrate 121 manufactured according to this embodiment, the common electrode 534 is not formed over the resistive film removal regions 533. However, the electric potential can be distributed uniformly in the transparent resistive film 532 as in the first embodiment by forming the resistive film removal regions 533 inside the common electrode 534. The distance S between the adjacent sides of the common electrode 534 and the resistive film removal regions 533 is more than or equal to 0 mm and less than or equal to 5 mm (0 mm$\leq$S$\leq$5 mm), so that this effect is produced.

(f) Sixth Embodiment

Figure 13A:
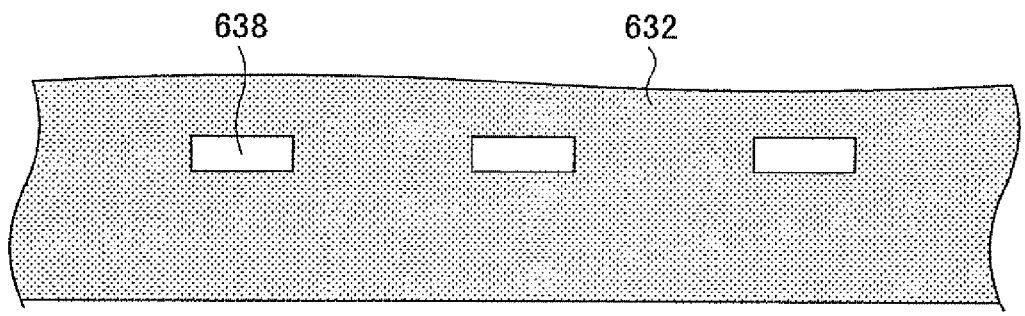
FIGS. 13A through 13C are diagrams illustrating a process for manufacturing the lower substrate according to a sixth embodiment of the present invention.
Figure 13B:
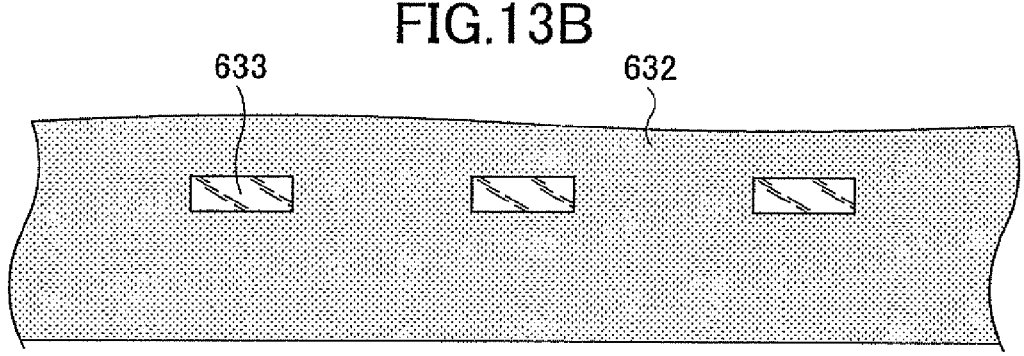
Figure 13C:
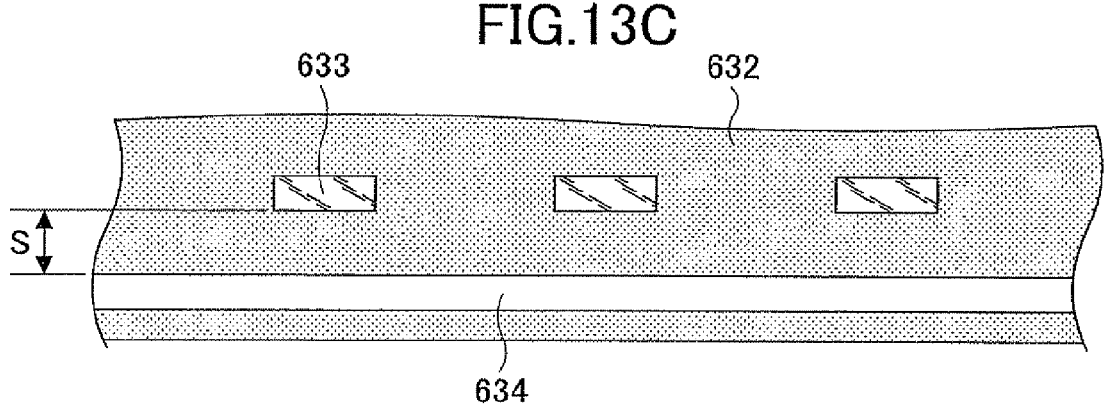

A description is given of a sixth embodiment of the present invention. This embodiment relates to a method of manufacturing a coordinate detector, and specifically to a method of manufacturing the above-described lower substrate 121. A description is given below, with reference to FIGS. 13A through 13C, of this embodiment. FIGS. 13A through 13C are plan views of the lower substrate 121, illustrating its manufacturing process according to this embodiment.

First, as illustrated in FIG. 13A, etching paste 638 is formed on a transparent resistive film 632 of ITO or the like, which is formed on a glass substrate (not graphically illustrated) by a process such as sputtering or vacuum evaporation. For example, this etching paste 638 is formed by a printing process such as screen printing. The etching paste 638 is formed on resistive film removal regions 633 described below. The etching paste 638 is formed inside a below-described common electrode 634, which is provided to extend along the peripheral edge of the transparent resistive film 632 (or of the glass substrate), so that a distance S (FIG. 13C) between the adjacent sides of the common electrode 634 and each resistive film removal region 633, that is, between the internal side of the common electrode 634 and a side of each resistive film removal region 633 facing toward the internal side of the common electrode 634, is more than or equal to 0 mm and less than or equal to 5 mm (0 mm≦S≦5 mm).

Next, as illustrated in FIG. 13B, the transparent resistive film 632 is removed by heat treatment where the etching paste 638 is formed. Thereafter, the remaining etching paste 638 is removed by cleaning. As a result, the transparent resistive film 632 having the resistive film removal regions 633 formed therein is formed on the glass substrate.

Next, as illustrated in FIG. 13C, the common electrode 634 is formed on the transparent resistive film 632 having the resistive film removal regions 633 formed therein. For example, the common electrode 634 is formed by printing a pattern of paste including Ag—C by screen printing and thereafter baking the paste.

The lower substrate 121 can be manufactured by subsequently forming the first insulating film 135, the first through fourth interconnects 136-1 through 136-4, the second insulating film 137, etc., in the same manner as in the first embodiment. The lower substrate 121 thus manufactured according to this embodiment can also be used as the lower substrate 121 of the coordinate detector of the first embodiment as in the case of the first embodiment. In the lower substrate 121 manufactured according to this embodiment, the common electrode 634 is not formed over the resistive film removal regions 633. However, the electric potential can be distributed uniformly in the transparent resistive film 632 as in the first embodiment by forming the resistive film removal regions 633 inside the common electrode 634. The distance S between the adjacent sides of the common electrode 634 and the resistive film removal regions 633 is more than or equal to 0 mm and less than or equal to 5 mm (0 mm≦S≦5 mm), so that this effect is produced.

According to one embodiment of the present invention, by way of example, there is provided a method of manufacturing a coordinate detector having a resistive film and a common electrode for applying a voltage to the resistive film, wherein an electric potential is applied from the common electrode to the resistive film to cause the electric potential to be distributed in the resistive film and the coordinates of a contact position of the resistive film is detected by detecting the electric potential of the contact position of the resistive film. The method includes the steps of: (a) applying a photoresist onto the resistive film formed on a substrate formed of an insulator; (b) forming a resist pattern on the resistive film by exposing the applied photoresist to light through a predetermined mask and subsequently developing the applied photoresist; (c) forming a resistive film removal region by removing a portion of the resistive film without the resist pattern; (d) removing the resist pattern after step (c); and (e) forming the common electrode over the resistive film removal region after step (d).

Thus, according to one aspect of the present invention, coordinate detectors capable of uniformly distributing the electric potential of a transparent resistive film can be manufactured with high yields by removing part of the transparent resistive film.

The present invention is not limited to the specifically disclosed embodiments, and variations and modifications may be made without departing from the scope of the present invention.

The present application is based on Japanese Priority Patent Application No. 2008-128139, filed on May 15, 2008, the entire contents of which are hereby incorporated by reference.

What is claimed is:

1. A method of manufacturing a coordinate detector having a resistive film and a common electrode for applying a voltage to the resistive film, the method comprising the steps of
    (a) applying a photoresist onto the resistive film formed on a substrate formed of an insulator;
    (b) forming a resist pattern on the resistive film by exposing the applied photoresist to light through a predetermined mask and subsequently developing the applied photoresist;
    (c) forming a resistive film removal region by removing a portion of the resistive film without the resist pattern;
    (d) removing the resist pattern after said step (c); and
    (e) forming the common electrode over the resistive film removal region after said step (d).

2. The method as claimed in claim 1, wherein said step (c) removes the portion of the resistive film by one of wet etching using an acid and dry etching.

3. The method as claimed in claim 1, wherein the resistive film removal region includes a first part in a periphery thereof, formed by removing the portion of the resistive film without the resist pattern, and a second part formed of the resistive film remaining inside the first part, and
    the first part and the second part are electrically insulated.

4. A method of manufacturing a coordinate detector having a resistive film and a common electrode for applying a voltage to the resistive film, the method comprising the steps of:
    (a) applying a photoresist onto the resistive film formed on a substrate formed of an insulator;
    (b) forming a resist pattern on the resistive film by exposing the applied photoresist to light through a predetermined mask and subsequently developing the applied photoresist; and
    (c) forming a resistive film removal region by removing a portion of the resistive film without the resist pattern,
    wherein the common electrode is formed between a peripheral edge of the resistive film and the resistive film removal region so that a distance between adjacent sides of the common electrode and the resistive film removal region is more than or equal to 0 mm and less than or equal to 5 mm.

5. The method as claimed in claim 4, wherein said step (c) removes the portion of the resistive film by one of wet etching using an acid and dry etching.

6. The method as claimed in claim 4, wherein the resistive film removal region includes a first part in a periphery thereof, formed by removing the portion of the resistive film without the resist pattern, and a second part formed of the resistive film remaining inside the first part, and
    the first part and the second part are electrically insulated.

* * * * *